March 5, 1935. W. COURT 1,993,435
COLD VULCANIZATION OF RUBBER
Filed Aug. 11, 1933
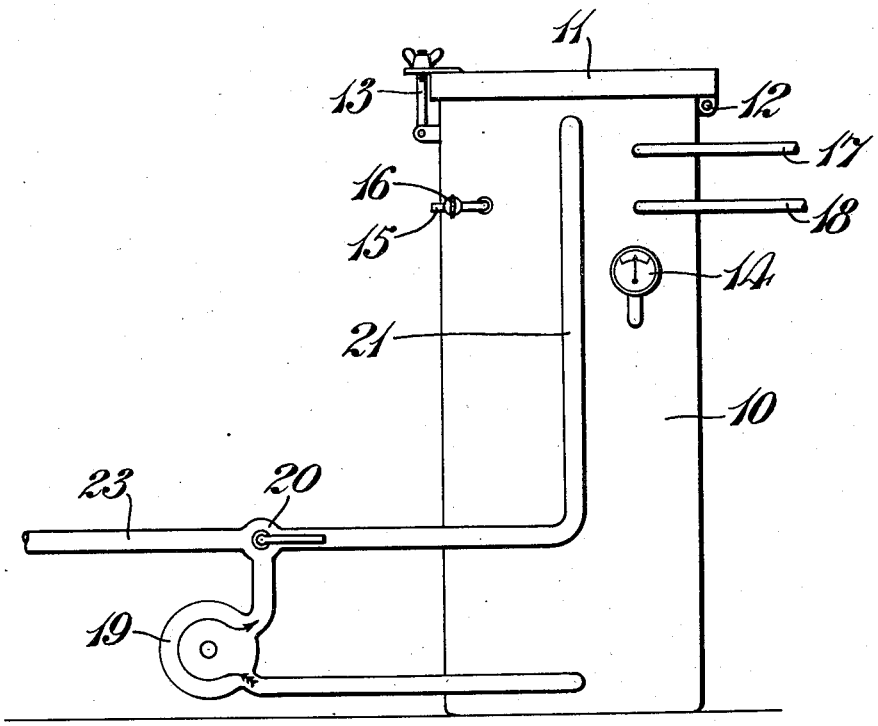
INVENTOR
Walter Court.
By Lacey & Lacey
Attys Patented Mar. 5, 1935

1,993,435

UNITED STATES PATENT OFFICE 1,993,435

COLD VULCANIZATION OF RUBBER

Walter Court, Brondesbury, England

Application August 11, 1933, Serial No. 684,728
In Great Britain August 11, 1932

2 Claims. (Cl. 18—53)

This invention relates to the cold vulcanization of rubber by treatment with hydrogen sulphide and sulphur dioxide.

In processes which are already known embodying this form of treatment, great difficulty is usually experienced in producing a product which is of uniform and high quality, while much trouble is brought about owing to the difficulty of providing leak-proof joints in cases where continuous vulcanizing processes are worked on this principle. The invention, therefore, has for its object to provide an improved and simplified process of cold vulcanization which is capable of working at a high rate of output and which requires comparatively unskilled labour in its manipulation. The finished product, moreover, is superior in quality and uniformity to that hitherto produced by the cold process.

According to the present invention, in a process for the cold vulcanization of rubber by means of gaseous hydrogen sulphide and sulphur dioxide, the articles to be treated are exposed firstly to an atmosphere comprising one of these gases, and then to an atmosphere containing a mixture of the two gases, which latter are hereinafter referred to as the vulcanizing gases. The articles may conveniently be disposed within a chamber, the gaseous pressure within which is reduced below atmospheric before the admission of the vulcanizing gases, while, if desired, the gaseous pressure within the chamber after the admission of the vulcanizing gases may be less than that of the surrounding atmosphere. The process is very convenient for working, as the articles to be vulcanized may be disposed within a chamber into which the vulcanizing gases are admitted after the sealing of the chamber has been effected, the amount of gas admitted being determined by the consequent increase in internal pressure. Thus the process may consist in sealing the articles to be vulcanized within a chamber, the gaseous pressure within which is reduced below that of the atmosphere, hydrogen sulphide being then admitted until the internal pressure has been increased to a predetermined amount, and then admitting sulphur dioxide until the internal pressure has been increased by a further predetermined amount. If desired, the internal pressure within the chamber may be further increased by the admittance of air, and the vulcanizing gases are preferably circulated by means of a pump or equivalent in order that a uniform cure may be effected.

The invention also provides a convenient form of apparatus for carrying out the process according to the invention consisting of a vessel connected to a vacuum pump and to a supply of the vulcanizing gases, circulating means being provided whereby the gas content of the vessel may be thoroughly mixed.

In carrying the invention into effect for the vulcanization of rubber-coated and like fabrics, the cloth to be treated is accommodated upon a suitable rack or former which is arranged to pass into the curing vessel, which may conveniently be cylindrical in shape, two of such racks or formers conveniently being arranged to make up one cure. After placing the cloth in the vessel, the door of the latter is fastened with a quick-acting mechanism, and a vacuum pump connected with the vessel is operated so that the internal pressure is reduced, for example by an amount corresponding to twelve inches of mercury. The vacuum pump is then stopped and hydrogen sulphide in gaseous form is allowed to enter the chamber until the internal pressure has increased by seven inches of mercury, i. e., so that there is a "vacuum" equivalent to five inches of mercury. The supply of hydrogen sulphide is then stopped and sulphur dioxide is admitted until the "vacuum" has fallen to two inches, so that the vessel now contains an amount of sulphur dioxide corresponding to a pressure of three inches of mercury. Air is then admitted in order to dispense with the remaining "vacuum" pressure corresponding to two inches of mercury, and the gaseous content of the vessel is thoroughly mixed and agitated by means of a circulating pump which is operated for a period of ten minutes in order that a uniform product may be obtained.

The vacuum pump is once again brought into operation for drawing off the remains of the vulcanizing gases, and when this has been effected the vessel is opened and the racks or formers removed.

One form of apparatus for carrying out the invention is illustrated diagrammatically in the accompanying drawing.

A chamber 10 having a lid 11 pivotally attached at 12 and provided with clamping means 13, is arranged to receive the articles to be vulcanized. The chamber 10 is fitted with a pressure gauge 14 and an air inlet pipe 15 controlled by means of a tap 16, while inlet pipes 17 and 18 arranged in the upper part of the chamber serve for admitting hydrogen sulphide and sulphur dioxide respectively from suitable cylinders or reservoirs, not shown.

A pump 19 driven by an electric motor or other suitable means is connected through the medium of a two-way tap 20 with a pipe 21 entering the top of the chamber 10, while the inlet of the pump is connected to the bottom of the chamber by means of a pipe 22. The other port of the tap 20 connects, by means of a pipe 23, with a suitable plant, not shown, for disposing of or dissolving the vulcanizing gases after use.

In operating the apparatus, the articles to be vulcanized are sealed in the chamber 10 and the pump 19 is arranged to discharge through the pipe 23, thus lowering the pressure within the chamber below atmospheric. Hydrogen sulphide is then admitted through the pipe 17 until the desired pressure rise has taken place, after which the supply is cut off and sulphur dioxide is admitted through the pipe 18 as previously described. By connecting the pump with the pipe 21 said pump is caused to circulate the gases through the chamber 10, and after sufficient time has elapsed for effecting vulcanization, the tap 16 is opened and the exhaust of the pump 19 is connected with the pipe 23, thus scavenging the chamber 10 in readiness for the removal of the vulcanized articles.

It will be understood that this procedure may be varied in order to suit various forms of articles or material to be vulcanized, the amounts of gas admitted and the other factors being arranged to suit the prevailing conditions. Moreover, in some cases the vulcanizing gases may be forced into the vessel or chamber under pressure, the amounts of gas admitted preferably being ascertained by the change of pressure within the chamber. Although it is preferable that the hydrogen sulphide should be admitted to the chamber before the sulphur dioxide, it will be understood that this order may be reversed.

What I claim is:—

1. A process for the cold vulcanization of rubber wherein the articles to be treated are first exposed to an atmosphere containing a predetermined quantity of hydrogen sulphide and then adding a predetermined quantity of sulphur dioxide and subjecting the articles to the mixture of the two gases.

2. A process for the cold vulcanization of rubber by means of gaseous hydrogen sulphide and sulphur dioxide consisting in enclosing the articles to be vulcanized within a container and sealing the container, reducing the pressure therein below that of the atmosphere, allowing hydrogen sulphide gas to enter the chamber until a predetermined rise in pressure has taken place, then permitting sulphur dioxide to enter the chamber and mix with the hydrogen sulphide, the pressure being still less than atmospheric, then admitting air until atmospheric pressure is attained, circulating the mixed air and gases through the container for the purpose of securing uniform vulcanization, and finally withdrawing the mixture of air and gases while flooding the container with fresh air and then removing the articles from the container.

WALTER COURT.